Sept. 11, 1962    G. M. FLYNN    3,053,212
CAN BODY SIDE SEAM SOLDERING MACHINE AND METHOD
Filed April 23, 1958    3 Sheets-Sheet 1
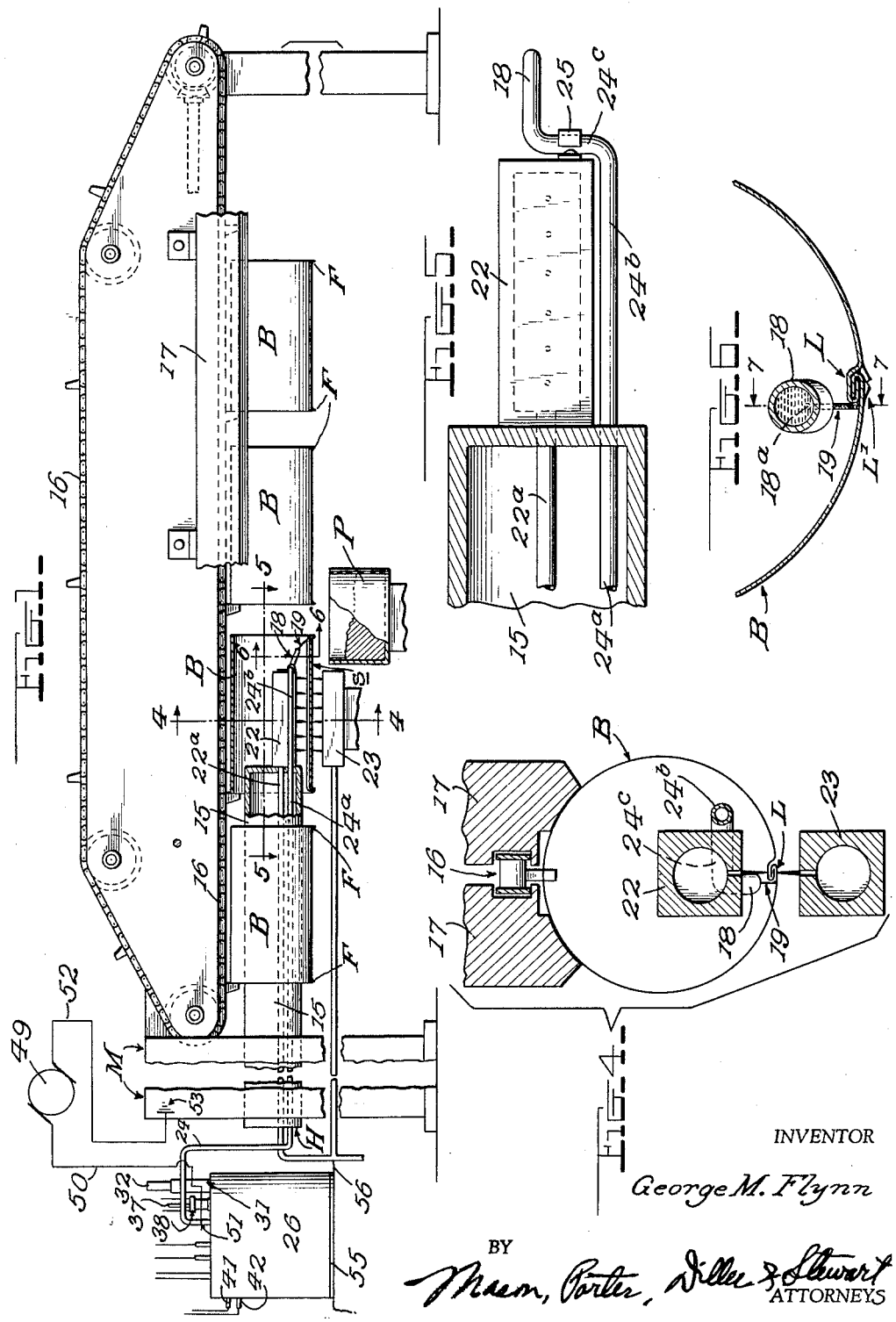
INVENTOR
George M. Flynn
BY
Mason, Porter, Diller & Stewart
ATTORNEYS Sept. 11, 1962 G. M. FLYNN 3,053,212
CAN BODY SIDE SEAM SOLDERING MACHINE AND METHOD
Filed April 23, 1958 3 Sheets-Sheet 2
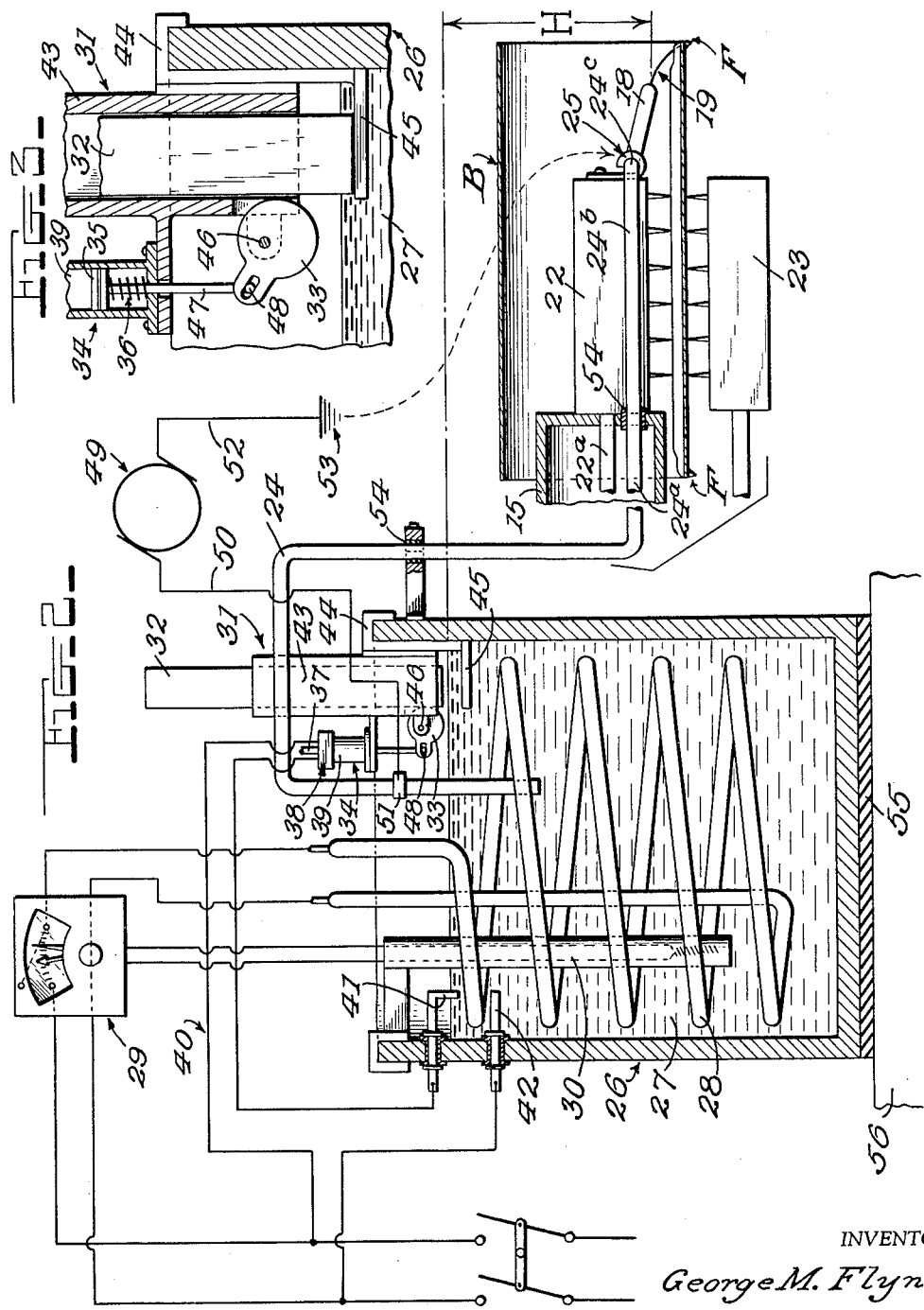
INVENTOR
George M. Flynn
BY
Macm, Porter, Deller & Stewart
ATTORNEYS Sept. 11, 1962   G. M. FLYNN   3,053,212
CAN BODY SIDE SEAM SOLDERING MACHINE AND METHOD
Filed April 23, 1958   3 Sheets-Sheet 3
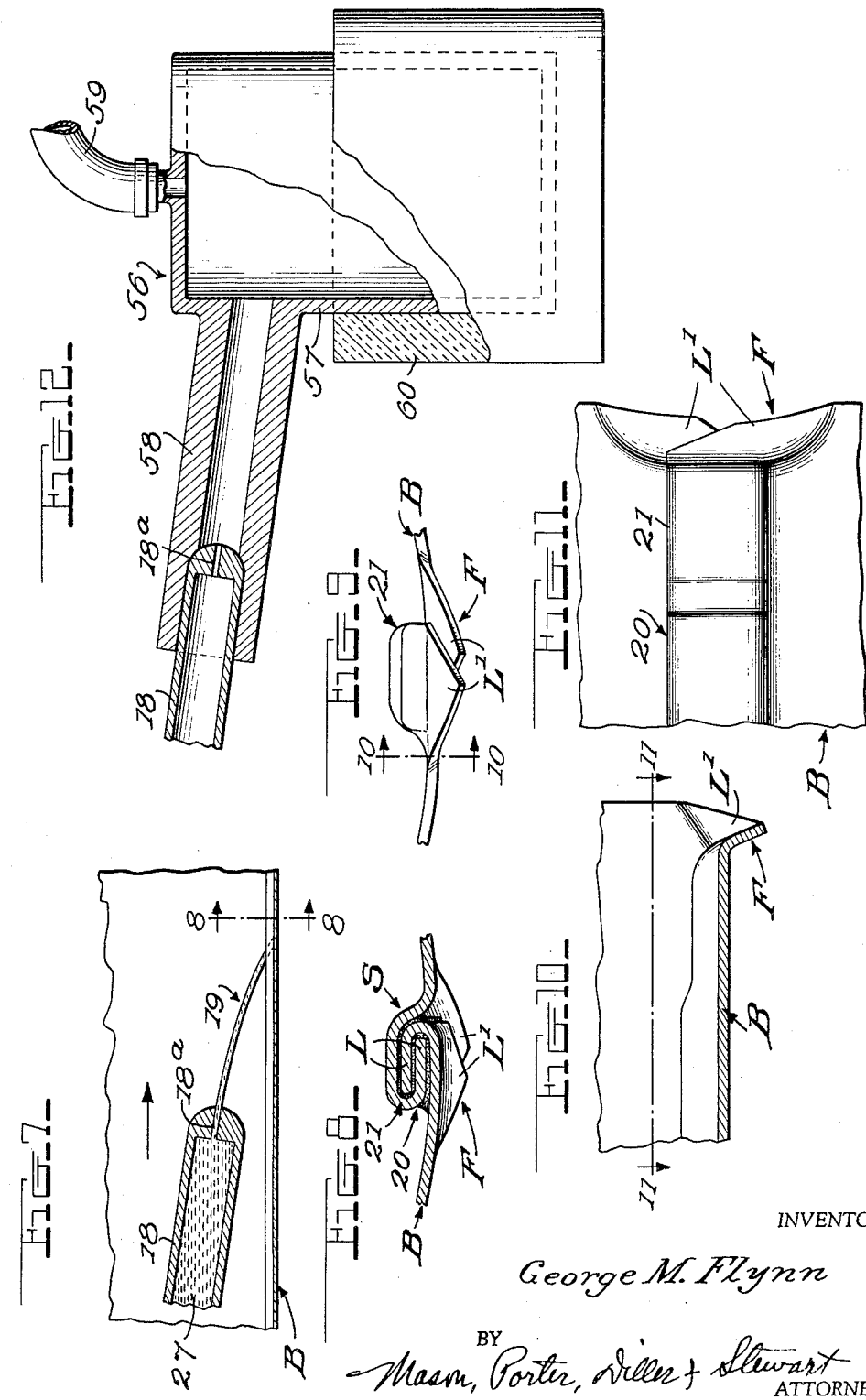
INVENTOR
George M. Flynn
BY
Mason, Porter, Diller & Stewart
ATTORNEYS

CAN BODY SIDE SEAM SOLDERING MACHINE AND METHOD

George M. Flynn, Chicago, Ill., assignor to Continental Can Company, Inc., New York, N.Y., a corporation of New York
Filed Apr. 23, 1958, Ser. No. 730,492
7 Claims. (Cl. 113—60)

This invention relates to the manufacture of metal cans having soldered side seams and rolled end seams and is directed particularly to the soldering of said side seams. In forming the side seams, it is customary to provide metal body blanks having lock and lap side seam portions; the lap portions being necessary to reduce the thickness of metal at the juncture of said side seams and the rolled end seams. The lock portions are in the form of hook flanges to be interlocked.

It is customary to feed the body blanks to a body maker which bends said blanks into can body form, overlaps the lap seam portions and initially engages the hook flanges, and then bumps these flanges to clinch them together. The can bodies are then processionally fed from the body maker to a soldering station at which the lock and lap seam portions are soldered together by soldering means, said soldering means being more fully described hereinafter. Excess solder is then scraped or wiped from the soldered seams.

The soldered can bodies are feed to a flanging station at which the ends of said bodies are outwardly bent to provide them with circumferential flanges for incorporation in rolled end seams. These flanges include the lap portions of the soldered side seams.

Although billions of cans are manufactured annually, there are but two can body side seam soldering processes of commercial importance: firstly, high speed, outside soldering using a rotary soldering iron or solder roll (see Kronquest 1,476,405, FIGURE 1); secondly, low speed, inside soldering using floating irons (see Kronquest 1,666,707—FIGURES 2 and 5) which is limited to the soldering of can bodies bearing a full outside lithographic decoration. These processes are not competitive: they have separate and distinct application; despite recognized limitations both have continued unchallanged since their inception some quarter century ago. While direct gas flame preheating is commonly used in both of these soldering systems, the side seam is finally heated to the prerequisite soldering temperature by direct soldering iron (outside roll or inside irons) contact. Thus, the soldering iron temperature and pressure, and the rate at which the can bodies are drawn across the soldering iron result in relatively great frictional resistance, considering the fragility of the can body itself and the side seam structure in particular. These detrimental frictional forces effective between the can bodies and the soldering iron place unsurmountable limitations on soldering speed. Also, soldering machines already are so elongated that the critical soldering iron pressure and placement, relative to the line of can body movement, varies excessively because of the thermal expansion of machinery components.

The present invention provides a new and superior, highly practicable and rapid soldering system for soldering can body side seams. The side seams are precisely heated to soldering temperature and soldered without frictional contact; hence, the ultimate speed of can body manufacturing operations is no longer limited to the speed of the soldering process proper. Considering typical production speeds of about 400 cans a minute, the length of the soldering station (preheater burners, solder pot, prewiper burners and buff wiper) is reduced from about 10 feet to 5 inches by precision side seam heating with 0.018" orifice, oxyacetylene, needle flames and soldering with a 0.035" orifice, molten solder stream. These orifice size references are to be considered illustrative rather than limiting. Heat losses are reduced because of the relatively instantaneous attainment of side seam soldering temperature and soldering, in combination with the precision confinement of can body heating to the side seam portions proper. Because the soldering iron (outside roll or inside irons) is eliminated so is the solder pot surface layer of molten fluxing salts. The prerequisite amount of molten solder is reduced from about 600 to 60 pounds. The prewiper burners, the buff wiper and the buff wiper splash shielding device are eliminated. Solder is no longer lost in the wiping operation, nor wastefully applied to the can body areas bordering the side seam proper. Less side seam flux is needed because the reduced heating time decreases the evaporation of said flux.

Besides improving and simplifying the soldering process, the present invention improves the overall quality of the soldered can bodies. Large numbers of cans are made with protective or decorative organic coatings which are degraded by the heat of the soldering operation; said coatings benefit by the reduced side seam heating time interval particular to the invention. Elimination of the wiped solder cut improves the appearance of plain can bodies, and provides corresponding advantages relative to can bodies having outside protective or decorative coatings. Cans with desirably heavy and unbroken inside solder fillets are produced in large volume on conventional outside soldering machines with painstaking effort; such fillets are easily obtained with the present invention. The soldering of preflanged side seam portions reduces the possibility of open laps occurring in the subsequent flanging operation.

This invention provides a novel apparatus including a molten solder discharge nozzle fixedly mounted in position to deliver a stream of molten solder to the inner side seam regions of the advancing can bodies, and means for precisely heating the seam regions of said bodies to soldering temperature as they approach said nozzle, thus causing the molten solder to flow between all seam portions which must be soldered together.

A further object has been to provide a novel machine including a horn around which the can bodies are advanced during heating and soldering and to utilize said horn in mounting the molten solder discharge nozzle and a heater for the seam regions of said bodies.

A still further object has been to provide the above mentioned nozzle and heater mounting horn in the form of an extension of the conventional horn of the body maker, allowing advance of the can bodies directly to the internal soldering station from said body maker.

Another object has been to deliver the molten solder to the seam regions of the can bodies at the linear velocity and in the direction of body travel and from a nozzle having the cross-sectional area of the capillary seam space and positioned close to said seam regions, to allow gentle laying of the molten solder stream along the seam regions, with no solder splash, as the bodies advance.

Yet another object has been to so position the molten solder discharge nozzle that it will deliver the molten solder to the inner seam opening of each can body if said body has a seam including interhooked flanges. By "inner seam opening" I refer to the channel existing between the bight of the inner hook flange and the contiguous inner surface of the can body.

Still further objects have been to provide for gravity flow (preferably syphonic) of the molten solder from a reservoir to the discharge nozzle; to provide for keeping the molten solder in said reservoir at a substantially constant level; to provide for maintaining the molten solder in said reservoir at a substantially constant temperature, and to prevent temperature drop of the molten solder as it flows to the discharge nozzle.

With the above and other objects in view that will hereinafter appear, the nature of the invention will be more clearly understood by reference to the following detailed description, the appended claims and the several views illustrated in the accompanying drawings.

In the drawings:

FIGURE 1 is a side elevation, partly in section, showing the machine.

FIGURE 2 is a vertical sectional view through the molten solder reservoir and associated elements and also showing elements of FIGURE 1 on a larger scale.

FIGURE 3 is an enlarged vertical section through the solid solder supply means (upper right corner of FIGURE 2) showing the solder delivery controlling member in delivery permitting position.

FIGURE 4 is an enlarged transverse section on the plane of line 4—4 of FIGURE 1.

FIGURE 5 is an enlarged horizontal section on the plane of line 5—5 of FIGURE 1.

FIGURE 6 is an enlarged transverse section on the plane of line 6—6 of FIGURE 1.

FIGURE 7 is a detail vertical longitudinal section on line 7—7 of FIGURE 6.

FIGURE 8 is a detail transverse section on line 8—8 of FIGURE 7.

FIGURE 9 is a fragmentary end view showing two of the pre-flanged lap portions of a can body, before soldering.

FIGURE 10 is a fragmentary longitudinal section on line 10—10 of FIGURE 9.

FIGURE 11 is a fragmentary view on line 11—11 of FIGURE 10.

FIGURE 12 is a vertical section, partly in elevation showing a device for starting flow through the molten solder conduit.

The construction shown in the drawings will be rather specifically described but it is to be understood that variations may well be made. Also, while the machine has been illustrated for use in soldering lock and lap side seams having pre-flanged lap portions, its use is by no means restricted to the production of this particular type of seam.

Referring to FIGURE 1, portions of a body maker M are shown. As usual, the body maker includes a horn H around which pre-fluxed body blanks are bent in the usual way. The body maker also initially engages the fluxed lock portions L and fluxed lap portions $L^1$ which are to be embodied in the side seams S, and then bumps the interengaged hook flanges constituting said lock portions, to clinch them together in readiness for soldering. Suitable provision may be embodied in the body maker M for pre-flanging the lap portions $L^1$ at the ends of the seam, as seen more particularly at F in FIGURES 8 to 11.

A longitudinal extension 15 is provided on the horn H: and a feed chain 16 is suitably mounted and driven, to processionally feed the can bodies B from the body maker M along said horn extension 15 to the soldering station s and then beyond this station for final flanging and, if desired, the performance of other operations. Magnetic guide rails 17 are shown for guiding the bodies B as they are fed by the chain 16.

Beyond the horn extension 15, at the soldering station s, a molten solder discharge nozzle 18 of any desired construction is fixedly mounted in such a position as to deliver a stream 19 of molten solder to the inside seam openings 20 (FIGURE 8) of the advancing can bodies B, each of said seam openings being formed by the channel existing between the bight 21 of the inner hook flange of each can body and the contiguous inner surface of said can body. The stream of molten solder is also delivered to the lap portions $L^1$. The molten solder flows between the interhooked lock portions L and between the lap portions $L^1$ and thus effectively solder bonds these elements, producing the completed seams S as shown in FIGURE 8. When using pre-flanged can bodies, as the solder bonding is performed after the preflanging F of the lap portions $L^1$, there is no danger of breaking the solder bonds between said lap portion $L^1$ at the end-flanging station.

The nozzle 18 is shown as declining toward the seam regions of the can bodies B but such a declination is not essential. The delivered solder stream 19, however, should be emitted in the direction of the body travel and the nozzle should be close to the seam zones of the can bodies to cause said nozzle to gently lay the molten solder along said seam zones with no danger of solder splash.

The discharge velocity of the solder steam 19 should be about the same as the can body velocity, and the nozzle discharge orifice 18a should be such as to emit a solder stream of cross sectional area equivalent to or slightly less than that of the capillary seam spaces of the can bodies. Under the nozzle 18, a pot P is provided to catch solder descending between can bodies, for remelting.

Internal and external oxyacetylene gas burners 22 and 23, respectively are provided to precisely heat the seam regions of the can bodies B to soldering temperature as they approach the molten solder discharge nozzle 18. The inner burner 22 is suitably secured to and projects longitudinally beyond the horn extension 15, as seen in FIGURES 1, 2 and 5 and the gas supply conduit 22a extends within said extension and the horn H.

A conduit 24 is provided to conduct the molten solder to the discharge nozzle 18. A major portion 24a of this conduit extends longitudinally within the horn H and horn extension 15, as seen in FIGURES 1 and 5, but said conduit projects at 24b beyond the end of said horn extension 15, and is here disposed in close proximity to the burner 22. At the end of this burner remote from the horn extension 15, the conduit is directed laterally at 24c, is secured at 25 to said burner end, and then continues to form the nozzle 18.

A reservoir 26 (FIGURES 1 and 2) is provided to contain molten solder 27 and supply this molten solder to the conduit 24. This reservoir is mounted, preferably on the body maker M, at such an elevation that gravity flow of the molten solder can take place through the conduit 24 to the nozzle 18: and said conduit 24 is preferably in the form of a syphon tube. Thus, by (1) maintaining a substantially constant temperature and consequent fluidity of the solder, (2) maintaining a substantially constant head or level H of the molten solder, (3) preventing temperature drop of the molten solder while flowing through the conduit 24, (4) accurately dimensioning the nozzle orifice 18a, and (5) properly relating these factors with the speed of can body travel, the discharged solder stream 19 will not fluctuate and uniform depositing of solder along the seam regions of the can bodies will result.

An electric heating coil 28 (FIGURE 2) is provided in the reservoir 26 and its circuit is controlled by a conventional switch mechanism 29 in turn controlled by a thermo-couple or the like 30 immersed in the molten solder 27 in said reservoir 26. Thus, the molten solder 27 may be maintained at a substantially constant temperature and its fluidity will consequently remain substantially uniform.

A solid solder supply means 31 (FIGURES 2 and 3) is provided to deliver solid solder 32 into the molten solder 27 in the reservoir as required, to maintain the predetermined molten solder level or head. The solid solder supply means 31 includes a delivery controlling member 33 movable from a delivery-preventing position (FIGURE 2) to a delivery permitting position (FIGURE 3) and vice versa. Automatically actuated means 34 is provided, responsive to the solder level in the reservoir 26, for (one) moving the member 33 to the delivery-permitting position of FIGURE 3 when the solder level lowers to a predetermined extent and for (two) moving said member 33 to the delivery-preventing position of FIGURE 2 when said level has been restored. Thus, a substantially constant head of molten solder is attained.

The actuating means 34 is preferably in the form of a vertical cylinder and piston assembly, the piston 35 of which (see FIGURE 3) is shiftable downwardly by compressed air and shiftable upwardly by a spring 36 upon exhaust of the compressed air. The compressed air supply conduit is fragmentarily shown at 37 in FIGURE 2 and a well-known, so called, Bellows valve is indicated at 38 for controlling the admission of compressed air to and the exhaust of compressed air from the cylinder 39 of the assembly 34. The actual valve member of the Bellows valve 38 is operable to one position by spring means and to another position by solenoid action. The solenoid or solenoids is/are embodied in an electric circuit 40 including upper and lower contacts 41 and 42 cooperable with the molten solder 27 in forming a circuit making and breaking switch. When this switch opens by lowering of the solder level from the contact 40, the Bellows valve 38 opens the cylinder 39 to exhaust and the spring 36 raises the piston 35 as seen in FIGURE 3, thereby moving the member 33 to the position in which it permits delivery of solid solder 32 into the molten solder 27 in which it immediately melts. As soon as enough solid solder has been delivered to raise the solder 27 to the contact 41, the Bellows valve 38 closes the cylinder 39 to exhaust and admits compressed air to said cylinder. Consequently, the piston 35 is moved downwardly and this moves the member 33 to the position of FIGURE 1, in which it prevents further delivery of solid solder into the molten solder 27 in the reservoir 26.

The solder supply means 31 includes a vertical sleeve 43 supported upon the side wall of the reservoir 26, by means of a bracket 44. The sleeve 43 slidably receives a bar of the solder 32 and this bar is normally held against descent by the member 33 as shown in FIGURE 2. When this member 33 is released, however, as seen in FIGURE 3, the bar of solder may descend by gravity into the molten solder 27 in the reservoir 26: and a stop 45 on the bracket 44 limits the descent. As soon as the lower end of the solder bar enters the molten solder 27, it starts to melt. As this melting continues and adds to the molten solder 27, the solder bar 32 descends more and more until, upon restoration of the molten solder level, further descent is prohibited by movement of the member 33 back to the position of FIGURE 2. This member 33 is preferably a cam pivotally mounted at 46 on the lower end of the sleeve 43 at one side of said sleeve and adapted to clamp the solder bar 32 against the opposite side of said sleeve. The piston rod 47 of the piston 35 is connected at 48 with the cam 33.

In order to heat the conduit 24 and prevent temperature drop of the molten solder flowing therethrough to the nozzle 18, said conduit 24 is formed from a metal highly resistant to the flow of electric current and is so embodied in an electric circuit that it acts as a resistance heater. The heated solder conduit could be constructed with a non-conducting core wrapped, plated or sheathed in the electrically resistant metal. A generator 49 (FIGURES 1 and 2) is shown for supplying the required electric current. A conductor 50, from one terminal of the generator 49, is connected at 51 to the inlet end of the conduit 24. Another conductor 52, from the other terminal of the generator 49, is grounded at 53 to the frame of the body maker M. The delivery end of the conduit 24 is grounded on the burner 22 by means of the securing means 25. All other portions of the conduit 24 are either spaced from or insulated from metal parts which could cause short-circuiting of the generator current. For example, see the spacing and the insulators 54 in FIGURE 2. Then, too, in order to prevent short circuiting through the molten solder 27 and the reservoir 26, the latter, if constructed from metal, will be insulated at 55 from its support 56 on the body maker M. Should the reservoir be of non-conducting material or lined with such material, the insulation 55 would, of course, be unnecessary.

In FIGURE 12, a syphon starter 56 is shown for initially drawing the molten solder through the conduit 24 and nozzle 18, or for re-starting the syphon should it be accidentally interrupted and the tube 24 accidentally filled with air. The starter 56 includes a molten solder receiving tank 57 having an inlet neck 58 at its upper end to snugly receive the nozzle 18. A suction conduit 59 is connected with the upper end of the tank 57 for producing a partial vacuum in said tank and in the conduit 24 and nozzle 18. Molten solder flow may thus be initially started or re-started if accidentally interrupted and the initial stream in each instance will be caught in the tank 57 and may be poured from the latter through the neck 58 upon disengagement of the latter from the nozzle 18. For safe and convenient handling, the tank 57 is covered where necessary with thermal insulation 60.

*Operation*

The desired head H of molten solder 27 is established in the reservoir 26 and is automatically maintained by the solder supply means 31 and associated elements. The required temperature and consequent fluidity of the molten solder are attained and maintained by the heating coil 28 and the controls 29, 30. The burners 22 and 23 are lighted and the molten solder conducting conduit 24 is heated by operating the generator 49, said conduit then acting as a resistance heater. Flow of molten solder is started by application and operation of the syphon starter 56 (FIGURE 12). This starter is then removed and the initial stream of molten solder is caught in the pot P. The body maker M is then started and the body blanks, pre-fluxed where necessary, are fed to said body maker as usual. This body maker forms the can bodies B around the horn H, initially engages the lock and lap seam portions of the blanks, bumps the lock portions L to clinch them together, and in the present instance pre-flanges the lap portions $L^1$ as seen more particularly at F in FIGURES 8 to 11. The body maker then processionally feeds the can bodies to the feed chain 16 in equally spaced relation. The feed chain 16 continues the procession along and beyond the horn extension 15, the burners 22 and 23 heat the seam regions of the advancing can bodies to soldering temperature, and the molten solder stream 19 is delivered to the inner seam openings 20 of said bodies and to the lap portions $L^1$.

The molten solder, thus delivered, immediately flows by capillarity between the lock L and lap $L^1$ seam portions of the bodies B and solder-bonds them together, with no solder escaping at the exteriors of the can bodies, because of the facts that the speed of the solder stream 19 is about the same as the speed of the can bodies B, and the cross sectional area of said stream is about the same as that of the capillary seam spaces. All portions of the solder stream 19 discharging between the advancing can bodies, are caught in the pot P. The can bodies with their completed side seams S are fed to a flanging machine by which the end flanges of said body are completed. As the lap portions $L^1$ have been pre-flanged before soldering, the flanging machine has no tendency to break the solder bonds between said lap portions.

From the foregoing, it will be seen that novel and advantageous provision has been made for attaining the desired ends. However, attention is again invited to the possibility of making variations and to the fact that the invention is not restricted to soldering lock and lap seams, nor to the soldering of can bodies having pre-flanged ends.

I claim:

1. In a can body side seam soldering apparatus, a frame, can body conveying means carried by said frame for guiding and processionally advancing can bodies in a generally horizontal path with side seams of the can bodies being presented downwardly, a molten solder reservoir positioned adjacent said frame, a molten solder discharge nozzle, means for supporting said solder discharge nozzle within the general confines of the path of can bodies above and spaced from the path of can body side seams with said solder discharge nozzle being positioned for directing a stream of molten solder downwardly onto interiors of can body side seams passing therebeneath, and means connecting said molten solder reservoir to said solder discharge nozzle for delivering a continuous stream of molten solder from said solder discharge nozzle.

2. The apparatus of claim 1 together with a solder receptacle disposed below the path of can bodies and in the path of the solder stream from said nozzle for catching solder discharged from said nozzle in the absence of a can body in the path of the solder stream.

3. The apparatus of claim 1 wherein said means connecting said molten solder reservoir to said solder discharge nozzle being in the form of a continuously open conduit.

4. A structure as specified in claim 1, in which the molten solder is fed by gravity from said reservoir to said nozzle, and automatic level control means for maintaining a substantially constant level of molten solder in said reservoir and thereby maintain constant discharge of molten solder from said nozzle.

5. A structure as specified in claim 1, in which said reservoir is disposed above the plane of said nozzle and said conduit conducts the molten solder by gravity, automatic heating means for maintaining the molten solder in said reservoir at a substantially constant temperature, automatic level control means for maintaining the molten solder at a substantially consant level in said reservoir, and separate means for heating said conduit to prevent drop in temperature of the molten solder flowing therethrough, whereby the discharge of molten solder from said nozzle is constant.

6. In an apparatus for maintaining a constant supply of molten solder, a reservoir for the molten solder, means carried by said reservoir for positioning an elongated solder bar for gravitational movement into said reservoir, a delivery controlling member movable from a delivery-preventing position engaged with a solder bar to a delivery-permitting position releasing the solder bar, and automatic means carried by said reservoir and controlled by the molten solder level in said reservoir for moving delivery controlling member to said delivery-permitting position when the solder level in said reservoir lowers to a predetermined extent and for moving said delivery controlling member to said delivery-preventing position in engagement with the same solder bar when said level has been raised to a predetermined extent.

7. The apparatus of claim 6 wherein said delivery controlling member is in the form of cam cooperating with a fixed member to clamp a solder bar therebetween.

References Cited in the file of this patent

UNITED STATES PATENTS

| | | |
|---|---|---|
| 1,623,293 | Williams et al. | Apr. 5, 1927 |
| 1,969,803 | Kruse | Aug. 14, 1934 |
| 2,193,955 | Weisenburg et al. | Mar. 19, 1940 |
| 2,348,495 | Peterson | May 9, 1944 |
| 2,350,824 | Rojo | June 6, 1944 |
| 2,415,542 | Vawryk | Feb. 11, 1947 |
| 2,430,219 | Elser | Nov. 4, 1947 |
| 2,469,392 | Jones et al. | May 10, 1949 |
| 2,597,893 | Nordquist | May 27, 1952 |
| 2,730,983 | Campbell et al. | Jan. 17, 1956 |
| 2,773,466 | Gedde | Dec. 11, 1956 |
| 2,841,111 | Walker | July 1, 1958 |
| 2,962,995 | Smith | Dec. 6, 1960 |

FOREIGN PATENTS

| | | |
|---|---|---|
| 778,260 | Great Britain | July 3, 1957 |